Patented Oct. 24, 1939

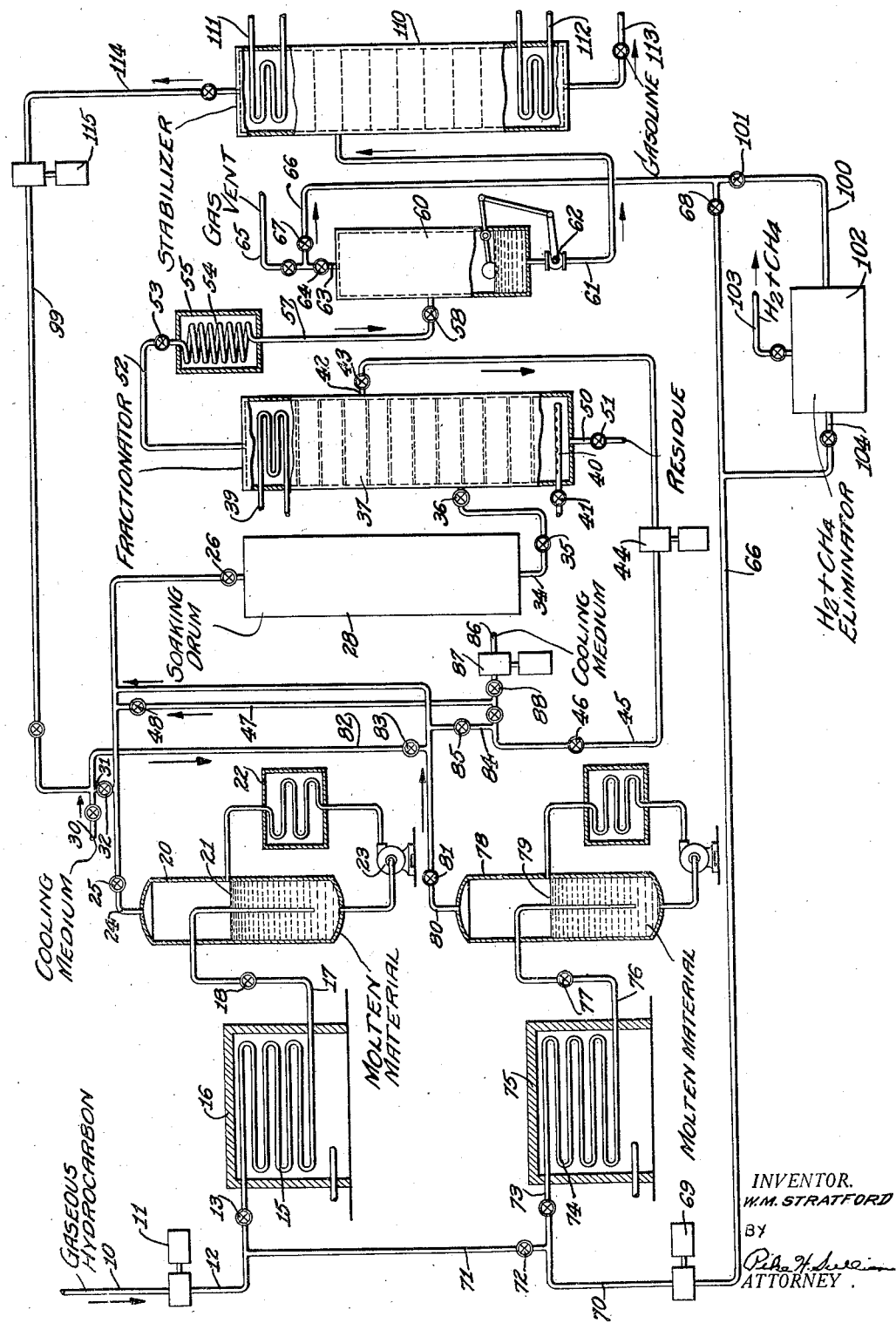

2,177,421

UNITED STATES PATENT OFFICE 2,177,421

PREPARATION OF MOTOR FUELS

William M. Stratford, Mamaroneck, N. Y., assignor to The Texas Company, New York, N. Y., a corporation of Delaware Substituted and refiled for abandoned application Serial No. 731,245, June 19, 1934. This application June 19, 1935, Serial No. 27,395

21 Claims. (Cl. 196—10)

This invention relates to the pyrolytic conversion of lower boiling hydrocarbons to higher boiling hydrocarbons, and particularly to the conversion of normally gaseous hydrocarbons into higher molecular weight hydrocarbons boiling within the range of commercial gasoline.

The invention broadly contemplates a process in which normally gaseous hydrocarbons, such as natural gas or gases produced in the pyrolytic decomposition of petroleum hydrocarbons, are very rapidly heated under superatmospheric pressure to a high cracking temperature to effect conversion to a considerable degree into unsaturated hydrocarbons. The resulting highly-heated mixture comprising unsaturated hydrocarbons and the comparatively saturated unconverted gas is then quickly cooled or quenched by reducing the temperature to one at which a desired combination or polymerization of the unsaturated compounds takes place. The products of the cracking reaction are maintained at this temperature while under superatmospheric pressure for a suitable time to effect the formation of liquid hydrocarbons, such operation being sometimes referred to hereinafter as a "soaking" of the products of the cracking reaction. The soaking treatment of the unconverted gas and the products of the high temperature decomposition may be effected in the presence of additional gases containing polymerizable constituents, introduced into the system for the further purpose of quenching or lowering the temperature of the products of the high temperature decomposition.

As an additional or alternative feature, the invention includes employing a liquid hydrocarbon as a quenching medium. This material may advantageously be a straight run naphtha which has a low anti-knock value. In the course of its rapid elevation to high temperature during the quenching operation and the further subjection to the soaking treatment at elevated temperatures and pressures, this naphtha may be reformed, that is, converted into a naphtha having a relatively high anti-knock value and may enter into desirable reactions with the gases undergoing polymerization.

The invention also contemplates the separation and the resubjection to high temperature decomposition conditions of such portions of the charge as may have been unconverted during the initial subjection to these conditions. This may be accomplished either in the original heating apparatus or in a separate apparatus within which different conditions of temperature may be maintained.

In general, the treatment is carried out in stages, the first stage being a high pressure, high temperature conversion of saturated constituents of the original gases to unsaturates or olefins, effected at very short time of reaction, and arrested to prevent further reaction at the high temperatures of the initial stage to products of undesired character. This initial stage is then followed by a soaking period at a lower temperature and longer time of reaction and under about the same pressure as is used in the first or decomposition stage, wherein a polymerization of unsaturates to normally liquid products is effected.

The operation of the process may be understood by referring to the following description and the accompanying drawing. In the drawing:

The single figure is a more or less diagrammatic view, partly in elevation and partly in vertical section, illustrating apparatus wherein the process of my invention may advantageously be carried out.

Referring to the drawing, the numeral 10 represents a line through which gaseous hydrocarbons are conducted from a storage, not shown, to a pump 11, which may be of a type capable of delivering the hydrocarbons under pressures of from 500 pounds per square inch to as high as 2000 to 3000 pounds per square inch or higher. The highly compressed gases pass from the pump 11 through a line 12 having a valve 13, and then through a heating coil 15 positioned within a furnace 16. The preheated gases discharged from the coil 15 are delivered through a pipe 17, fitted with a valve 18, and are discharged into and to a point near the bottom of a bath of molten material 21 situated within a reaction chamber 20. The bath 21 may comprise any high melting point substance such as lead, cryolite or similar stable substance. The bath is maintained at the desired temperature by suitable means, as for example, by circulating a portion thereof through a heater 22 by means of a pump 23, or by other suitable means such as electrical resistance heaters positioned in the bath. The hot products of the reaction which takes place within the reaction chamber 20 are drawn off through a line 24 having valves 25 and 26 and are delivered into a soaking drum 28.

If the gases undergoing cracking in the chamber 20 are permitted to remain at the high temperatures maintained in the chamber 20 for too long a time, polymerizing reactions may take place which are undesirable both from the standpoint of producing products of an undesired nature and from the standpoint of control of the polymerizing reactions which are exothermic in character. Consequently, the hot cracked gaseous products leaving the chamber 20 through the line 24 are cooled or quenched to a considerably lower temperature at which polymerizing reactions of a more desirable character may be effected, by means of some suitable cooling medium. For example a gaseous cooling medium may be introduced into the line 24 through a line 31 having a valve 32 and which is supplied with such gaseous cooling medium from either a line 30 or a line 99 or both. Alternatively or additionally, the quenching or cooling may be effected by delivering liquid hydrocarbons, preferably naphtha of comparatively low anti-knock value, into the line 24 in a manner set forth hereinbelow.

The soaking drum 28, which may be of any suitable type capable of withstanding the temperatures and pressures employed in the operation of the process, is provided at its bottom with a drawoff line 34 having valves 35 and 36 and leading to a fractionating tower 37. The fractionating tower is provided with cooling means 39 near the top thereof, and at the bottom with a steam inlet pipe 40 having a valve 41, and serves as a means for separating gaseous hydrocarbons, together with vapors of hydrocarbons boiling within a motor fuel range, from hydrocarbons having higher boiling points. The former gases and vapors are drawn off from the top of the fractionating tower through a vapor line 52 having a valve 53 and are delivered into a cooling coil 54 located in a condenser 55, where the normally liquid hydrocarbons are substantially condensed.

The bottom of the fractionating tower 37 is provided with a drawoff line 50 through which high boiling hydrocarbons which collect as a residue in the course of the fractionation operation are drawn off to storage. A valve 51 is provided to control the flow through the line 50. There is also fitted into an intermediate point in the fractionating tower structure a drawoff line 42, having a valve 43, and through which a liquid hydrocarbon fraction having a boiling point range somewhat higher than that of the usual motor fuel may be taken off.

The liquid hydrocarbons and gaseous hydrocarbons, which are drawn off from the discharge side of the condenser coil 54, are delivered through a line 57 having a valve 58 into a gas separator 60 wherein they are substantially separated, the liquid hydrocarbons comprising a fraction suitable for motor fuel being drawn off in a continuous stream from the bottom of the separator chamber through a line 61, having a float-controlled valve 62. The gaseous hydrocarbons, on the other hand, are drawn off from the top of the separator through a line 63 having a valve 64 and passed either through a valved branch 65 to a suitable gas storage tank (not shown) or else recycled for further reaction.

The gases drawn off from the top of the separator 60 will contain hydrogen, methane and varying amounts of other gaseous hydrocarbons and it may or may not be desirable to recycle these gases. In any event, however, it is necessary to provide a means for eliminating from the system hydrogen together with any other gases which are not reacted to liquid products and which therefore tend to accumulate in the system, or an equivalent portion of the total gaseous products leaving the separator 60. This may be done by simply withdrawing a sufficient amount of gas through the line 65 to prevent accumulation, while delivering the remaining portion through a line 66 having valves 67 and 68 to a recycling compressor 69. In the preferred instance, however, all of the gases removed from the separator 60 are delivered through the line 66 (the valve 67 being open and the valve 68 being closed) and through a branch line 100 having a valve 101 to a hydrogen-elimination stage 102 having a valved hydrogen vent 103 and a valved residue gas line 104, the latter communicating with the pipe 66 at a point between the valve 68 and the compressor 69.

The hydrogen elimination stage 102 may comprise any suitable absorption or separating system suitable for the purpose of separating the gases and the hydrogen or hydrogen and methane and constituents of higher molecular weight. Such systems are well known in the art and need not be described here in detail. The hydrogen or mixture of hydrogen and methane passes out of the system through the vent 103, whereas the constituents of higher molecular weight which are capable of being reacted to form valuable end products are returned through the line 104 to the line 66.

Where the elimination step 102 is so conducted as to remove methane as well as hydrogen, the gases compressed by the pump 69 are delivered through a line 70 and a branch line 71 having a valve 72 to the line 12 which supplies gases to the preheating coil 15.

Where, however, methane is not substantially eliminated in the stage 102, or where the gases returning through the line 104 to the line 66 are considerably more refractory in character than the gases entering the system through the line 10, these gases are delivered by means of the compressor 69 through the line 70 and through a valved branch line 73 to a preheater coil 74 located in a furnace 75.

The preheated gases discharged from the coil 74 are delivered through a line 76 having a valve 77 into and to a point near the bottom of a bath of molten material 79 situated within a reaction chamber 78. The material comprising the molten bath 79 may be similar to that comprising the bath 21 in the reaction vessel 20, or else it may comprise a substance which, because of the more stringent temperature requirements in this, the second conversion stage, may have a higher melting point. The method of maintaining the temperature of the bath 79 may, with advantage, be the same as that described in connection with the first conversion stage.

The hot products of the pyrolytic conversion which takes place in the reaction chamber 78, are drawn off through a line 80 having a valve 81 and are delivered into the line 24. Gaseous hydrocarbons for cooling may be introduced into the line 80 from the line 30 through a branch line 82 having a valve 83. As indicated hereinabove, cooling of the hot conversion products in the lines 24 and 80 may alternatively or additionally be effected by introducing into these lines liquid hydrocarbons. These liquid hydrocarbons may either be products of the fractionation operation in the tower 37, or a straight run naphtha obtained through a line 86 from an extraneous source. These materials may be injected into the lines 24 and/or 80 by means of pumps 44 and/or 87 having a common discharge line 45 provided with valves 46 and 88 and manifolded to the lines 24 and 80 by means of branch lines 47 and 84, having valves 48 and 85, respectively.

In a typical operation of the process in connection with the above described apparatus, a fraction of natural gas, or any other hydrocarbon gas containing substantial amounts of gaseous paraffinic hydrocarbons such as propane and butane, is drawn from storage and delivered through the line 10 to the pump 11. This pump discharges the hydrocarbons under a pressure of between 500 and 3000 pounds per square inch or even higher into the heating coil 15 of the preheater 16 where the temperature of the hydrocarbons is raised to about 800° to 1100° F., that is to say, a temperature just short of one at which rapid conversion of saturates to unsaturates is effected.

Upon leaving the coil 15, the heated hydrocarbons are conducted through the line 17 to a point near the bottom of the bath 21 situated within the reaction chamber 20. The bath 21 is preferably maintained at such a temperature that the hydrocarbons which are injected into it will be heated to a temperature of from 1200° to 1500° F. or higher, say to 1700° F. The variables controlling the heating of the hydrocarbons, including the depth of the lead bath, its temperature, and the charge rate of the gaseous hydrocarbons, are so controlled that the hydrocarbons may be raised to the aforementioned temperature in the minimum space of time.

An important feature of the invention is the very short time during which the charging material is subjected to the higher decomposition temperatures. The reason underlying this is that at the temperatures employed in the chamber 20 the saturated constituents undergo a very rapid conversion to unsaturates or olefins capable of being polymerized to normally liquid products. If such polymerization is allowed to proceed to any material extent at the high temperature employed for the production of olefins in the chamber 20, the olefins which are produced will tend to polymerize to products which are aromatic in character, such for example as benzol and, furthermore, the strongly exothermic polymerizing reactions which would thus be involved would make the reaction extremely difficult to control on account of the great liberation of heat at the high temperatures employed. It is therefore desirable that the polymerizing reactions be prevented from being carried out to any material extent at the high temperatures employed for the conversion of saturates to unsaturates in the reaction chamber 20, and on the contrary to cause the polymerizing reactions to take place at a lower temperature where they may be more easily controlled and where the resultant products will be more strongly olefinic or naphthenic in character. For these reasons, the reactions taking place in the chamber 20 are quickly checked, permitting only very short times of reaction of not more than one or two minutes and preferably 15 seconds or less, by quickly quenching the products of reaction to the desired polymerizing temperature by introducing thereto cool gaseous or liquid hydrocarbons of a suitable character as described.

This quenching or cooling is preferably effected as the products of the thermal conversion effected in the reaction chamber 20 are delivered through the vapor line 24 into the polymerizing chamber soaking drum 28, for example by means of gaseous hydrocarbons admitted through the line 31.

These gaseous hydrocarbons may comprise natural gases or oil refinery gases, preferably rich in olefins, produced in the cracking of hydrocarbon oils or gases, and may be obtained from an external source or may comprise a portion or a fraction of the ultimate products of the entire process as will be described more fully in connection with the rest of the drawing. The purpose of introducing such materials is not only to effect a cooling or quenching of the hot products of the gas-cracking operation but also to effect a conversion of constituents of the gases thus introduced to normally liquid compounds suitable for use as motor fuel.

The temperature of the products of the thermal decomposition may also be effectively and rapidly reduced by mixing therewith a normally liquid hydrocarbon which is preferably saturated in character, that is to say of low anti-knock value, and which is readily susceptible to reformation by thermal treatment into a product of only slightly different boiling point range but of higher anti-knock value. In the present example, the liquid hydrocarbon of this character may be obtained either from a subsequent fractionation operation or from an extraneous source of straight run naphtha. Provision is made for introducing either one or both of these liquid hydrocarbons into the vapor line 24 by manifolding thereto the line 45 which connects with an intermediate point in the fractionating tower 37, and the line 86 which connects an independent source of straight run naphtha or other suitable liquid hydrocarbon.

In certain operations of the present invention, it may be found desirable to preheat both the refinery gases as well as the liquid hydrocarbons to an appropriate temperature above atmospheric so as to bring about a controlled reduction in temperature of the products of decomposition in the line 24 without unnecessarily cooling the same.

The mixture of the hydrocarbons formed in the line 24 is delivered into the top of the soaking chamber 28, which is maintained under a pressure of from 500 to 3000 pounds per square inch, preferably above 2000 pounds per square inch, and wherein the hydrocarbons are subjected to an appropriate soaking treatment at a predetermined temperature of, for example, from approximately 700° to 1000° F., depending somewhat upon the character of the hydrocarbons operated upon.

Under the conditions maintained within the soaking chamber, further cracking and polymerizing of the hydrocarbons present may be effected, whereby desirable compounds useful as motor fuel are formed. More specifically, these reactions may comprise polymerization of gaseous unsaturates or olefins to normally liquid materials, together, where liquid hydrocarbons such as naphtha have been introduced, with reformation of such liquid hydrocarbons to other liquid hydrocarbons of increased anti-knock value and having boiling points within a motor fuel boiling point range, as well as interreactions between normally liquid products undergoing conversion and unsaturated materials undergoing polymerization.

Thus, according to the present invention, the highly heated products of the very rapid or substantially instantaneous decomposition of the original gases charged are mixed either with cooler gases preferably containing a high percentage of unsaturated components or with liquid hydrocarbons which are substantially saturated in character. In some operations, it may be found advantageous to use both gaseous and liquid hydrocarbons as cooling mediums.

The products which are formed in the soaking chamber 28 are drawn off through the line 34 and conducted into the fractionating tower 37, which may be maintained at the same pressure as the soaking drum or at a considerably lower pressure as desired. The fractionating tower 37 is so operated as to produce a vapor fraction consisting of normally gaseous hydrocarbons and hydrocarbons boiling within the range of commercial gasoline, while free from higher boiling constituents, such as gas oil. This vapor fraction is taken off from the top of the fractionating tower and is passed to the condenser 55 where the normally liquid hydrocarbons are condensed. The mixture of condensate and gaseous hydrocarbons passing from the cooling coil is then separated in separator 60, the liquid hydrocarbons being drawn off from the bottom thereof and conducted to a suitable storage or to a stabilizer 110 to be described more fully hereinbelow. The gaseous hydrocarbons, on the other hand, may either be passed to storage or else returned in part to another stage of the present process, as will be described more fully hereinbelow.

In the operation of the fractionating tower 37, there may be produced several liquid fractions which may have widely varying characteristics. For example, there will ordinarily be drawn off from the bottom of the fractionating tower a liquid fraction which may have the character of gas oil or the like, and which may contain heavier constituents such as tar, unless provision has been made for removing tar prior to the entry of the vapors into the tower 37, while from an intermediate point of the tower there may be taken off a liquid hydrocarbon fraction of the nature of a heavy naphtha or a kerosene. This material may be used for cooling the products of the thermal decomposition by injection into the line 24.

The uncondensed gas which is separated from the liquid hydrocarbons in the separator 60 comprises principally the more refractory components and/or products of conversion of the original charging stock, as well as such components of the refinery gases which were charged into the line 24 as a cooling medium, and which were not affected by the soaking treatment to which they were subjected in the soaking drum 28.

As has been indicated hereinabove, it is preferred to treat the uncondensed gas to eliminate therefrom hydrogen and/or hydrogen and methane before recycling the remaining constituents, which elimination is effected in the stage 102, where the elimination stage is operated to remove hydrogen and methane and where the remaining gases are similar in character to those comprising the charging stock introduced through the line 10 these residual gases from which hydrogen and methane have been largely separated are preferably returned to the inlet of the coil 15, whereas when eliminated gases comprise principally hydrogen or in any event where the residual gases are different in character from and more refractory than the charging stock introduced through the line 10, the residual gases are preferably delivered to the coil 74.

For example, in accordance with the latter alternative, the residual gases are delivered to the pump 69, which delivers them under a pressure of between 500 and 3000 pounds per square inch, into the heating coil 74 wherein their temperature is raised to 900° F. or higher. The heated hydrocarbons are then immediately delivered through the line 76 to a point near the bottom of the lead bath 79. The operating conditions maintained within the reaction chamber 78 are such that the gases are very rapidly heated to a temperature which may be as high as 1800° F. or higher.

The heated gases, comprising the products of the thermal conversion which takes place within the reaction chamber 78, are drawn off through the line 80 and conducted into the line 24. In order to limit the time of reaction, as soon as the gaseous products of conversion leave the reaction chamber 78, and in that way to prevent any high temperature soaking effect within the line 80, it is desirable that they be quickly cooled to a substantially lower temperature. This is effected, as in the previous conversion stage in the process, by injecting into the vapor line 80 a suitable gaseous or liquid hydrocarbon. Provision for the use of a gaseous hydrocarbon is made by connecting the line 80 with the lines 30 and 99 by means of a branch line 82 having a valve through which such gases may be supplied. Similarly, a liquid hydrocarbon, for example from the fractionating tower 37, or straight run naphtha from an independent source, may be supplied to the line 80 through lines 45 and 84 and/or lines 86 and 84, respectively.

As has been indicated hereinabove, the gaseous hydrocarbon medium employed for quenching the products from the chambers 20 and 78 or either may comprise a fraction of the normally gaseous products produced in the process. However, the gaseous or very low boiling hydrocarbon constituents most suitable for such use may actually be drawn off from the separator 60 in liquid form, that is to say dissolved in the liquid hydrocarbons withdrawn from the bottom of the separator 60, the amount thus dissolved naturally varying with the pressure maintained upon the separator 60.

In the drawing, I have illustrated means whereby these normally gaseous or very low boiling hydrocarbons may be recovered and employed as a cooling or quenching medium in the process, such means comprising principally a stabilizer 110 to which the liquid products from the line 61 are delivered. The stabilizer 110 is of conventional design, being provided with cooling means 111 and heating means 112 located respectively at the top and bottom thereof, and is internally provided with the usual plates or trays for assisting fractionation. In the stabilizer 110, the liquid hydrocarbons removed from the separator 60 are re-fractionated to drive off dissolved gaseous constituents such as butane and butylene. The stabilized motor fuel product is withdrawn from the bottom of the stabilizer 110 through a valved line 113 and is delivered to storage, while the separated light hydrocarbons pass through a valved line 114 to a compressor 115 which in turn delivers them to the line 99 from which they are supplied to the line 24 and the line 80 or both as desired.

It will be apparent to those skilled in the art that various types of heat exchange equipment may advantageously be used in order to effect heat economies in the operation of the process. In addition, the heating coils 15 and 74, which have been shown in independent preheaters, may be placed within a common furnace structure and so positioned therein that the desired working temperatures may be obtained. Economy in construction may also warrant the use of one lead bath reaction chamber instead of the two which are shown in the drawing of the apparatus, in which case the proper heating of the two independent streams of gases undergoing treatment may be effected by varying the length of the flow path of the gases through the lead bath.

Moreover, while I have illustrated and described gas conversion operations in which gases containing saturated constituents are first preheated in a heating coil to temperatures short of active conversion temperatures and are then passed through a bath of molten material whereby they are very rapidly heated to active conversion temperatures I may conduct the gas conversion reactions entirely in heated coils such as those illustrated in 15 and 74, thus dispensing with the chambers 20 and 78, or I may alternatively dispense with the preheating coils 15 and 74 and impart all the heat necessary to effect conversion in the baths 21 and 79. In any event, however, as has been indicated hereinabove, the heating of the largely saturated gases to conversion temperature is done as rapidly as possible in order to insure very short times of contact as set forth.

It will be obvious to those skilled in the art that my invention is susceptible of considerable modification in detail and is therefore not to be construed as limited to the specific examples which have been set forth hereinabove by way of illustration but may variously be practiced and embodied within the scope of the claims hereinafter made.

This application is a continuation in part of my co-pending application Serial No. 680,368 filed July 14, 1933; and is substituted for my application Serial No. 731,245 filed June 19, 1934.

I claim:

1. The process of converting normally gaseous paraffinic hydrocarbons into normally liquid hydrocarbons suitable for use as motor fuel or the like, which comprises compressing a gas containing a substantial amount of such gaseous paraffinic hydrocarbons to an elevated superatmospheric pressure, preheating the compressed gases to a temperature short of active conversion thereof, thereafter substantially instantaneously heating the preheated gases to a conversion temperature sufficiently elevated to effect a rapid conversion of said gaseous paraffinic hydrocarbons to unsaturated hydrocarbon gases capable of being polymerized to normally liquid products, arresting the progress of such further reactions as may tend to take place at such elevated temperature by quickly cooling the resultant gaseous products to a substantially lower but still elevated temperature adapted to promote polymerization of said unsaturated hydrocarbon gases to normally liquid products, and maintaining the gases at said lower temperature for a period of time relatively long as compared to the time of reaction under the higher conversion temperature, without substantially reducing the pressure thereupon, removing the resultant products and cooling them to recover normally liquid products therefrom.

2. The process of converting normally gaseous paraffinic hydrocarbons into normally liquid hydrocarbons suitable for use as motor fuel or the like, which comprises compressing a gas containing a substantial amount of such gaseous paraffinic hydrocarbons to an elevated superatmospheric pressure, preheating the compressed gases to a temperature short of active conversion thereof, thereafter substantially instantaneously heating the preheated gases to a temperature sufficiently elevated to effect a rapid conversion of said gaseous paraffinic hydrocarbons to unsaturated hydrocarbon gases capable of being polymerized to normally liquid products, arresting the progress of such further reactions as may tend to take place at such elevated temperature by quickly cooling the resultant gaseous products to a temperature of from 700 to 1000° F. adapted to promote a polymerization of said unsaturated hydrocarbon gases to normally liquid products, and maintaining the gases at such polymerizing temperature for a period of time relatively long as compared to the time of reaction under the higher conversion temperature, without substantially reducing the pressure thereupon, removing the resultant products and cooling them to recover normally liquid products therefrom.

3. The process of converting normally gaseous paraffinic hydrocarbons into normally liquid hydrocarbons suitable for use as motor fuel or the like, which comprises compressing a gas containing a substantial amount of such gaseous paraffinic hydrocarbons to a pressure of from about 500 to 3000 pounds per square inch, preheating the compressed gases to a temperature short of active conversion thereof, therefter substantially instantaneously heating the preheated gases to a temperature of from 1200° F. to 1700° F. and maintaining them at such temperature for a very brief interval of time to effect a rapid conversion of said gaseous paraffinic hydrocarbons to unsaturated hydrocarbon gases capable of being polymerized to normally liquid products, then quickly cooling the resultant gaseous products to a temperature of from 700° to 1000° F. adapted to promote a polymerization of said unsaturated hydrocarbon gases to normally liquid products, and maintaining the gases at such polymerizing temperature for a period of time relatively long as compared to the time of reaction under the higher conversion temperature, without substantially reducing the pressure thereupon, removing the resultant products and cooling them to recover normally liquid products therefrom.

4. The process of converting normally gaseous paraffinic hydrocarbons into normally liquid hydrocarbons suitable for use as motor fuel or the like, which comprises compressing a gas containing a substantial amount of such gaseous paraffinic hydrocarbons to a pressure of from about 500 to 3000 pounds per square inch, preheating the compressed gases to a temperature short of of active conversion thereof, thereafter substantially instantaneously heating the preheated gases to a temperature of from 1200° F. to 1700° F. and maintaining them at such temperature for a very brief interval of time to effect a rapid conversion of said gaseous paraffinic hydrocarbons to unsaturated hydrocarbon gases capable of being polymerized to normally liquid products, then quickly cooling the resultant gaseous products to a temperature of from 700° to 1000° F. adapted to promote a polymerization of said unsaturated hydrocarbon gases to normally liquid products by introducing directly into said resultant gaseous products a relatively cool hydrocarbon, and maintaining the gases at such polymerizing temperature for a period of time relatively long as compared to the time of reaction under the higher conversion temperature, without substantially reducing the pressure thereupon, removing the resultant products and cooling them to recover normally liquid products therefrom.

5. The process of converting normally gaseous paraffinic hydrocarbons into normally liquid hydrocarbons suitable for use as motor fuel or the like, which comprises compressing a gas containing a substantial amount of such gaseous paraffinic hydrocarbons to a pressure of from about 500 to 3000 pounds per square inch, preheating the compressed gases to a temperature short of active conversion thereof, thereafter substantially instantaneously heating the preheated gases to a temperature of from 1200° F. to 1700° F. and maintaining them at such temperature for a very brief interval of time to effect a rapid conversion of said gaseous paraffinic hydrocarbons to unsaturated hydrocarbon gases capable of being polymerized to normally liquid products, then quickly cooling the resultant gaseous products to a temperature of from 700° to 1000° F. adapted to promote a polymerization of said unsaturated hydrocarbon gases to normally liquid products by introducing directly into said resultant gaseous products a stream of relatively cool naphtha distillate, and maintaining the gases at such polymerizing temperature for a period of time relatively long as compared to the time of reaction under the higher conversion temperature, without substantially reducing the pressure thereupon, removing the resultant products and cooling them to recover normally liquid products therefrom.

6. The process of converting normally gaseous paraffinic hydrocarbons into normally liquid hydrocarbons suitable for use as motor fuel or the like, which comprises compressing a gas containing a substantial amount of such gaseous paraffinic hydrocarbons to a pressure of from about 500 to 3000 pounds per square inch, preheating the compressed gases to a temperature short of active conversion thereof, thereafter substantially instantaneously heating the preheated gases to a temperature of from 1200° F. to 1700° F. and maintaining them at such temperature for a very brief interval of time to effect a rapid conversion of said gaseous paraffinic hydrocarbons to unsaturated hydrocarbon gases capable of being polymerized to normally liquid products, then quickly cooling the resultant gaseous products to a temperature of from 700° to 1000° F. adapted to promote a polymerization of said unsaturated hydrocarbon gases to normally liquid products by introducing directly into said resultant gaseous products a stream of gases rich in gaseous unsaturated hydrocarbon constituents, and maintaining the gases at such polymerizing temperature for a period of time relatively long as compared to the time of reaction under the higher conversion temperature, without substantially reducing the pressure thereupon, removing the resultant products and cooling them to recover normally liquid products therefrom.

7. The process of converting normally gaseous paraffinic hydrocarbons into normally liquid hydrocarbons suitable for use as motor fuel or the like, which comprises preheating a gas containing a substantial amount of such gaseous paraffinic hydrocarbons to a temperature short of active conversion thereof, substantially instantaneously heating the preheated gases to a conversion temperature sufficiently elevated to effect a rapid conversion of said gaseous paraffinic hydrocarbons to unsaturated hydrocarbon gases capable of being polymerized to normally liquid products in a first conversion stage, and subjecting resultant unsaturated hydrocarbon gases to a substantially lower but still elevated temperature and superatmospheric pressure in a soaking stage to promote polymerization of said unsaturated hydrocarbon gases to normally liquid products, removing the resultant products, cooling them and recovering normally liquid products therefrom, subjecting a portion of the remaining gaseous products to a higher conversion temperature than that first mentioned to effect a conversion of gaseous paraffin hydrocarbons to unsaturated hydrocarbon gases in a second and separate conversion stage, and introducing resultant gaseous products from said second conversion stage into said soaking stage.

8. The process of converting normally gaseous paraffinic hydrocarbons into normally liquid hydrocarbons suitable for use as motor fuel or the like, which comprises preheating a gas containing a substantial amount of such gaseous paraffinic hydrocarbons to a temperature short of active conversion thereof, substantially instantaneously heating the preheated gases to a conversion temperature sufficiently elevated to effect a rapid conversion of said gaseous paraffinic hydrocarbons to unsaturated hydrocarbon gases capable of being polymerized to normally liquid products in a first conversion stage, and subjecting resultant unsaturated hydrocarbon gases to a substantially lower but still elevated temperature and superatmospheric pressure in a soaking stage to promote polymerization of said unsaturated hydrocarbon gases to normally liquid products, removing the resultant products, cooling them and recovering normally liquid products therefrom, removing at least a substantial amount of hydrogen from the remaining gaseous products, subjecting thus-obtained hydrogen-freed gaseous products to a conversion temperature higher than that first mentioned in a second and separate conversion stage, and introducing the resultant gaseous products into said soaking stage.

9. The process of converting normally gaseous hydrocarbons consisting substantially entirely of paraffinic constituents into normally liquid hydrocarbons suitable for use as motor fuel or the like, which comprises compressing such a gas to an elevated superatmospheric pressure, preheating the compressed gas to a temperature short of active conversion thereof, substantially instantly heating the preheated gases to a conversion temperature sufficiently elevated to effect a rapid conversion of said gaseous paraffinic hydrocarbons to unsaturated hydrocarbon gases capable of being polymerized to normally liquid products, arresting the progress of such further reactions as may be promoted at such elevated temperature by quickly cooling the resultant gaseous products to a substantially lower but still elevated temperature adapted to promote polymerization of said unsaturated hydrocarbon gases to normally liquid products, and maintaining the gases at such polymerizing temperature in a soaking stage for a period of time relatively long as compared to the time of reaction under the higher conversion temperature, without substantially reducing the pressure thereupon, removing the resultant products, cooling them and recovering normally liquid products therefrom, fractionating the normally liquid products thereby recovered to remove low-boiling constituents and returning at least a part of said low-boiling constituents thereby removed to said soaking stage.

10. The process of converting normally gaseous hydrocarbons consisting substantially entirely of paraffinic constituents into normally liquid hydrocarbons suitable for use as motor fuel or the like, which comprises compressing such a gas to an elevated superatmospheric pressure, preheating the compressed gas to a temperature short of active conversion thereof, substantially instantly heating the compressed gases to a conversion temperature sufficiently elevated to effect a rapid conversion of said gaseous paraffinic hydrocarbons to unsaturated hydrocarbon gases capable of being polymerized to normally liquid products, arresting the progress of such further reactions as may be promoted at such elevated temperature by quickly cooling the resultant gaseous products to a substantially lower but still elevated temperature adapted to promote polymerization of said unsaturated hydrocarbon gases to normally liquid products, and maintaining the gases at such polymerizing temperature in a soaking stage for a period of time relatively long as compared to the time of reaction under the higher conversion temperature, without substantially reducing the pressure thereupon, removing the resultant products, cooling them and recovering normally liquid products therefrom, fractionating the normally liquid products thereby recovered to remove low-boiling constituents and returning the low-boiling constituents thus removed to the hot products passing from the high temperature conversion stage to the polymerizing stage for use as a cooling medium.

11. The process of converting normally gaseous paraffinic hydrocarbons into liquid hydrocarbons, which comprises compressing the gaseous hydrocarbons to a pressure of between 500 and 3000 pounds per square inch, preheating the compressed gas to a temperature of from 800° to 1100° F., substantially instantaneously heating the preheated gases to a temperature of from 1200° to 1700° F. to rapidly convert them into unsaturated hydrocarbons, then rapidly cooling to a temperature of between 700° and 1000° F., and soaking the thus cooled conversion products in this temperature range and under a pressure of between 500 and 3000 pounds per square inch to form liquid hydrocarbons, then separating the liquid hydrocarbons from any remaining gaseous hydrocarbons and recycling gaseous hydrocarbons thus-obtained for further conversion treatment to the preheating tsep.

12. The process of converting normally gaseous paraffinic hydrocarbons into liquid hydrocarbons, which comprises compressing the gaseous hydrocarbons to a pressure of between 500 and 3000 pounds per square inch, preheating the compressed gas to a temperature of from 800° to 1100° F., substantially instantaneously heating the preheated gases to a temperature of from 1200° to 1700° F. to rapidly convert them into unsaturated hydrocarbons, then rapidly cooling to a temperature of between 700° and 1000° F., and soaking the thus cooled conversion products in this temperature range and under a pressure of between 500 and 3000 pounds per square inch to form liquid hydrocarbons, separating the liquid hydrocarbons from any remaining gaseous hydrocarbons, withdrawing a portion of the latter, compressing them to a pressure of between 500 and 3000 pounds per square inch, preheating the compressed gases to a temperature of from 900° to 1100° F., substantially instantaneously heating the thus preheated gases in a separate heating zone to a temperature of between 1500° and 1800° F., quickly cooling the same to a temperature of between 700° and 1000° F., and introducing them into the aforementioned soaking stage.

13. The process of converting gases containing paraffinic constituents and gases rich in olefinic hydrocarbons into normally liquid hydrocarbons which comprises compressing both gases separately to a pressure of between 500 and 3000 pounds per square inch, preheating the paraffinic gases to a temperature of from 800° to 1100° F., substantially instantaneously heating the preheated gases to a temperature of between 1200° and 1700° F. to rapidly convert the gaseous paraffinic constituents into unsaturated hydrocarbon gases, then quickly cooling the heated gases to a temperature of from 700° to 1000° F. by admixture therewith of a suitable quantity of the compressed gases rich in olefinic constituents, soaking the mixture at this temperature and under a pressure of between 500 and 3000 pounds per square inch to effect a polymerization of unsaturated hydrocarbons to normally liquid hydrocarbons, separating the liquid hydrocarbons from remaining gaseous hydrocarbons, and recycling a portion of the latter to the first conversion stage.

14. The process of converting gases containing paraffinic constituents and gases rich in olefinic hydrocarbons into normally liquid hydrocarbons, which comprises compressing both gases separately to a pressure of between 500 and 3000 pounds per square inch, preheating the paraffinic gases to a temperature of from 800° to 1100° F., substantially instantaneously heating the preheated gases to a temperature of between 1200° and 1700° F. to convert the paraffinic constituents into unsaturated hydrocarbon gases, then quickly cooling the heated gases to a temperature of from 700° to 1000° F. by admixture therewith of a suitable quantity of compressed gases rich in olefinic hydrocarbons, soaking the mixture at this temperature and under a pressure of between 500 and 3000 pounds per square inch to effect a polymerization of unsaturated hydrocarbons to normally liquid hydrocarbons, separating the liquid hydrocarbons from remaining gaseous hydrocarbons, compressing a portion of the latter to a pressure of between 500 and 3000 pounds per square inch, preheating the compressed gases to a temperature of between 900° and 1000° F., substantially instantaneously heating the thus preheated gases in a separate heating zone to a temperature of between 1500° and 1800° F., then rapidly cooling them to a temperature of between 700° and 1000° F. by admixture therewith of a suitable quantity of relatively cool compressed gases rich in olefinic hydrocarbons and subjecting the mixture to the soaking operation as aforesaid.

15. The process of forming a motor fuel having a high anti-knock value which comprises compressing normally gaseous paraffinic hydrocarbons to a pressure of from 500 to 3000 pounds per square inch, preheating the compressed gases to a temperature of from 800° to 1100° F., substantially instantaneously heating the preheated gases to a temperature of from 1200° to 1700° F. to convert the paraffinic hydrocarbons into unsaturated hydrocarbons, quickly cooling the products of conversion to a temperature of from 700° to 1000° F. by admixture therewith of a naphtha having a low anti-knock value, soaking the resultant mixture at this temperature and under a pressure of from 500 to 3000 pounds per square inch to effect a conversion of unsaturated compounds and naphtha into normally liquid hydrocarbons having relatively high anti-knock value, separating the liquid hydrocarbons from remaining gaseous hydrocarbons, compressing a portion of the latter to a pressure of from 500 to 3000 pounds per square inch, preheating the compressed gases to a temperature of from 900° and 1100° F., substantially instantaneously heating the preheated gases in a separate heating zone to a temperature of between 1500° and 1800° F. to convert paraffinic hydrocarbons into unsaturated hydrocarbons, quickly cooling the thus heated gases to a temperature of from 700° to 1000° F. by admixture therewith of a naphtha, and introducing the mixture into the aforementioned soaking stage.

16. The process of forming a motor fuel of high anti-knock value which comprises separately compressing normally gaseous paraffinic hydrocarbons and normally gaseous olefinic hydrocarbons to a pressure of from 500 to 3000 pounds per square inch, preheating the paraffinic hydrocarbon gases to a temperature of between 800° and 1100° F., substantially instantaneously heating the thus preheated gases to a temperature of between 1200° and 1700° F. to rapidly convert paraffinic hydrocarbons into unsaturated hydrocarbons, then quickly cooling these hydrocarbons to a temperature of between 700° and 1000° F. by admixture therewith of suitable quantities of both the compressed olefinic gases and a normally liquid hydrocarbon having a low anti-knock value, soaking the resultant mixture under a pressure of from 500 to 3000 pounds per square inch to effect a conversion of unsaturated compounds and said liquid hydrocarbons into normally liquid hydrocarbons of relatively high anti-knock value, and separating the resultant normally liquid hydrocarbons from any remaining gaseous hydrocarbons.

17. The process for pyrolytically converting normally gaseous paraffinic hydrocarbons into liquid hydrocarbons which comprises compressing the gaseous hydrocarbons to an elevated superatmospheric pressure, preheating the compressed gas to a temperature short of active conversion, substantially instantaneously heating the preheated gases to a temperature sufficiently elevated to rapidly convert them into unsaturated hydrocarbons, then rapidly cooling to a temperature adapted to promote polymerization of unsaturated hydrocarbons, and soaking the thus cooled conversion products at polymerization temperature and under elevated superatmospheric pressure to form liquid hydrocarbons, then separating the liquid hydrocarbons from any remaining gaseous hydrocarbons and recycling the latter for further conversion treatment to the preheating step.

18. The process of forming a motor fuel of high anti-knock value which comprises separately compressing normally gaseous paraffinic hydrocarbons and normally gaseous olefinic hydrocarbons to a pressure of between 2000 and 3000 pounds per square inch, preheating the paraffinic hydrocarbon gases to a temperature of between 800° and 900° F., substantially instantaneously heating the thus preheated gases to a temperature of between 1200° and 1500° F. to convert the paraffinic hydrocarbons into unsaturated hydrocarbons, then suddenly cooling these hydrocarbons to a temperature of between 900° and 1000° F. by admixture therewith of suitable quantities of both the compressed olefinic gases and a normally liquid hydrocarbon having a low anti-knock value, soaking the resultant mixture under a pressure of between 2000 and 3000 pounds per square inch to effect the conversion of the unsaturated compounds and the liquid hydrocarbons into liquid hydrocarbons having high anti-knock values, separating the liquid hydrocarbons from any remaining gaseous hydrocarbons, withdrawing the latter, compressing them to a pressure of between 2000 and 3000 pounds per square inch, preheating the compressed gases to a temperature of between 900° and 1000° F., substantially instantaneously heating the preheated gases in a separate heating zone to a temperature of between 1500° and 1800° F. to convert any paraffinic hydrocarbons into unsaturated hydrocarbons, cooling the thus heated gases rapidly to a temperature in the range of between 900° and 1000° F. by admixing therewith suitable quantities of the compressed olefinic hydrocarbon gases and a normally liquid hydrocarbon having a low anti-knock value, and combining the resultant mixture with the hydrocarbon mixture in the soaking stage of the process.

19. The process for pyrolytically converting normally gaseous paraffinic hydrocarbons into liquid hydrocarbons which comprises compressing the gaseous hydrocarbons to an elevated superatmospheric pressure, preheating the compressed gas to a temperature short of active conversion, substantially instantaneously heating the preheated gases to a temperature sufficiently elevated to rapidly convert them into unsaturated hydrocarbons, then rapidly cooling to a temperature adapted to promote polymerization, and soaking the thus cooled conversion products at polymerization temperature and under elevated superatmospheric pressure to form liquid hydrocarbons, separating the liquid hydrocarbons from any remaining gaseous hydrocarbons, withdrawing the latter, subjecting gases thus obtained in a separate zone to conditions effective to produce polymerization thereof, and combining gases so treated with the hydrocarbons in the soaking stage of the process to undergo polymerization.

20. The process of converting normally gaseous hydrocarbons into normally liquid hydrocarbons suitable for use as motor fuel or the like, which comprises compressing a gas containing paraffinic hydrocarbons to an elevated superatmospheric pressure, preheating the compressed gas to a temperature short of active conversion thereof, substantially instantaneously heating said gases in the compressed state to a sufficiently elevated temperature to rapidly convert paraffinic hydrocarbons into olefinic hydrocarbons, quickly cooling the resultant gaseous products to a temperature adapted to promote polymerization of olefinic hydrocarbons, maintaining the cooled gaseous products at polymerization temperature while under superatmospheric pressure to form liquid hydrocarbons, removing the resulting products and recovering said liquid hydrocarbons.

21. The process of converting normally gaseous hydrocarbons into normally liquid hydrocarbons suitable for use as motor fuel, which comprises preheating hydrocarbon gas predominating in paraffinic hydrocarbons to a temperature short of active conversion thereof while at an elevated superatmospheric pressure, substantially instantaneously heating said preheated gases to a sufficiently elevated temperature while under elevated superatmospheric pressure to rapidly convert paraffinic hydrocarbons to olefinic hydrocarbons, cooling the resultant gaseous products, polymerizing olefinic hydrocarbons thus produced and cooled while under elevated superatmospheric pressure to liquid hydrocarbons containing motor fuel, and separating and recovering motor fuel from the products of polymerization.

WILLIAM M. STRATFORD.